United States Patent
Ali et al.

(10) Patent No.: US 11,977,149 B2
(45) Date of Patent: May 7, 2024

(54) FILTERING AND AGGREGATING DETECTION POINTS OF A RADAR POINT CLOUD FOR AN AUTONOMOUS VEHICLE

(71) Applicant: GM Global Technology Operations LLC, Detroit, MI (US)

(72) Inventors: Kamran Ali, Troy, MI (US); Wende Zhang, Birmingham, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 37 days.

(21) Appl. No.: 17/511,968

(22) Filed: Oct. 27, 2021

(65) Prior Publication Data

US 2023/0126749 A1    Apr. 27, 2023

(51) Int. Cl.
  *G01S 7/40*   (2006.01)
  *B60W 60/00*   (2020.01)
  *G01S 7/298*   (2006.01)
  *G01S 13/89*   (2006.01)

(52) U.S. Cl.
  CPC ........... *G01S 13/89* (2013.01); *B60W 60/001* (2020.02); *G01S 7/298* (2013.01); *G01S 7/40* (2013.01); *B60W 2420/408* (2024.01)

(58) Field of Classification Search
  CPC ...... G01S 13/89; G01S 7/298; G01S 13/5242; G01S 13/93–931; B60W 60/001; B60W 2420/52; G06F 18/23
  See application file for complete search history.

(56) References Cited

U.S. PATENT DOCUMENTS

| | | | |
|---|---|---|---|
| 2017/0300759 A1* | 10/2017 | Beard | H04N 7/183 |
| 2019/0266748 A1 | 8/2019 | Ahmad et al. | |
| 2020/0150677 A1 | 5/2020 | Walters et al. | |

(Continued)

FOREIGN PATENT DOCUMENTS

| | | | |
|---|---|---|---|
| CN | 103150747 A | | 6/2013 |
| CN | 112526513 A | * | 3/2021 |

OTHER PUBLICATIONS

CN-112526513-A Translation (Year: 2021).*

(Continued)

*Primary Examiner* — Matthew M Barker
(74) *Attorney, Agent, or Firm* — Vivacqua Crane, PLLC

(57) ABSTRACT

A scan aggregator and filter for an autonomous vehicle includes a plurality of radar sensors, where each radar sensor performs a plurality of individual scans of a surrounding environment to obtain data in the form of a radar point cloud including a plurality of detection points. The scan aggregator and filter also includes an automated driving controller in electronic communication with the plurality of radar sensors. The automated driving controller is instructed to filter each of the individual scans to define a spatial region of interest and to remove the detection points of the radar point cloud that represent moving objects based on a first outlier-robust model estimation algorithm. The automated driving controller aggregates a predefined number of individual scans together based on a motion compensated aggregation technique to create an aggregated data scan and applies a plurality of density-based clustering algorithms to filter the aggregated data scan.

20 Claims, 3 Drawing Sheets

(56) References Cited

U.S. PATENT DOCUMENTS

| | | |
|---|---|---|
| 2020/0226790 A1 | 7/2020 | Alvarez et al. |
| 2021/0031795 A1 | 2/2021 | Bariant et al. |
| 2021/0063560 A1 | 3/2021 | Bosse |
| 2022/0066544 A1 | 3/2022 | Kwon et al. |
| 2022/0153276 A1 | 5/2022 | Steyer et al. |
| 2022/0205786 A1 | 6/2022 | Liu et al. |
| 2022/0300745 A1 | 9/2022 | Yang et al. |
| 2022/0319050 A1 | 10/2022 | Mu et al. |

OTHER PUBLICATIONS

Haarbach, Adrian. Multiview ICP, Aug. 2015, pp. 1-9.

Schneider, et al. Odometry-based Online Extrinsic Sensor Calibration, RSJ International Conference on Intelligent Robots and Systems (IROS), Nov. 2013, pp. 1287-1292, IEEE, Tokyo, Japan.

Fantoni, et al. Accurate and automatic alignment of range surfaces, Oct. 2012, pp. 1-8, Department of Computer Science—University of Verona, Italy.

Andreff, et al. On-line Hand-Eye Calibration, 2nd International Conference on 3-D Digital Imaging and Modeling, Oct. 1999, pp. 430-436, National Research Council of Canada, Ottawa, Canada.

He, et al. M2DP: A Novel 3D Point Cloud Descriptor and Its Application in Loop Closure Detection, Oct. 2016, pp. 1-7.

Tsai, et al. A New Technique for Fully Autonomous and Efficient 3D Robotics Hand/Eye Calibration, IEEE Transactions on Robotics and Automation, Jun. 1989, pp. 345-358, vol. 5, No. 3 IEEE.

Furrer, et al. Evaluation of Combined Time-Offset Estimation and Hand-Eye Calibration on Robotic Datasets, Sep. 2017, pp. 1-15, Zurich, Switzerland.

Kellner, Dominik. Instantaneous Ego-Motion Estimation using Multiple Doppler Radars, May 2015, pp. 1-7.

Markley, et al. Averaging Quaternions, Journal of Guidance, Control, and Dynamics, Jul. 2007, pp. 1-11.

Anderson, et al. RANSAC for Motion-Distorted 3D Visual Sensors, RSJ International Conference on Intelligent Robots and Systems (IROS), Nov. 2013, pp. 2093-2099, IEEE, Tokyo, Japan.

* cited by examiner ing detection points of radar point clouds obtained by a radar sensor mounted to an autonomous vehicle is disclosed. The method includes filtering a plurality of individual scans of a surrounding environment obtained by the radar sensor to define a spatial region of interest, where the individual scans include data in the form of a radar point cloud including a plurality of detection points. The method includes filtering each of the individual scans to remove the detection points of the radar point cloud that represent moving objects based on a first outlier-robust model estimation algorithm. The method also includes aggregating a predefined number of the individual scans together based on a motion compensated aggregation technique to create an aggregated data scan. Finally, the method includes applying a plurality of
FILTERING AND AGGREGATING DETECTION POINTS OF A RADAR POINT CLOUD FOR AN AUTONOMOUS VEHICLE

INTRODUCTION

The present disclosure relates to a system and method for filtering and aggregating detection points of a radar point cloud obtained by a radar sensor mounted to an autonomous vehicle.

An autonomous vehicle may drive from a starting point to a predetermined destination with limited or no human intervention using various in-vehicle technologies and sensors. Autonomous vehicles include a variety of autonomous sensors such as, but not limited to, cameras, radars, LiDAR, global positioning systems (GPS), and inertial measurement units (IMU) for detecting a vehicle's exterior surroundings and status. However, if a camera or radar is moved from its mounting when the autonomous vehicle is repaired, undergoes an accident, or experiences a significant pothole or obstruction while driving, then the camera or radar sensor needs to be recalibrated, which is a manual and often cumbersome process. Furthermore, if the autonomous vehicle undergoes a wheel alignment, then the cameras and radars also require recalibration. This is because the wheels of the vehicle determine the direction of travel, which affects the aiming of the cameras and radars.

Millimeter wave (mmWave) radar is one specific technology that may be used with autonomous vehicles. For example, millimeter wave radar may be used to warn of forward collisions and backward collisions, to implement adaptive cruise control and autonomous parking, and to perform autonomous driving on streets and highways. It is to be appreciated that millimeter wave radar has advantages over other sensor systems in that millimeter wave radar may work under most types of weather and in light and darkness. A millimeter wave radar may measure the range, angle, and Doppler (radial velocity) of moving objects. A radar point cloud may be determined based on the data collected by the millimeter wave radar based on various clustering and tracking algorithms, which may be used to determine location, velocity, and trajectory of objects. However, radar point clouds based on data collected by millimeter wave radars, and in particular low-cost signal system on chip (SoC) based millimeter wave radars, may be too noisy and sparse to be used for robust and accurate pose estimation required for dynamic calibration purposes.

Thus, while current pose estimation approaches for autonomous vehicles achieve their intended purpose, there is a need in the art for filtering and aggregating radar point clouds to improve pose estimation for alignment purposes in a vehicle.

SUMMARY

According to several aspects, a scan aggregator and filter for an autonomous vehicle is disclosed. The scan aggregator and filter includes a plurality of radar sensors mounted to the autonomous vehicle. Each individual radar sensor performs a plurality of individual scans of a surrounding environment to obtain data in the form of a radar point cloud including a plurality of detection points. The scan aggregator and filter also includes an automated driving controller in electronic communication with the plurality of radar sensors. The automated driving controller is instructed to filter each of the individual scans to define a spatial region of interest. The automated driving controller is instructed to filter each of the individual scans to remove the detection points of the radar point cloud that represent moving objects based on a first outlier-robust model estimation algorithm. The automated driving controller is instructed to aggregate a predefined number of individual scans together based on a motion compensated aggregation technique to create an aggregated data scan. Finally, the automated driving controller is instructed to apply a plurality of density-based clustering algorithms to filter the aggregated data scan to determine a filtered aggregated data scan.

In another aspect, the automated driving controller executes instructions to filter each of the individual scans based on a radar cross sectional value, where the plurality of detection points of the radar point cloud representing target objects of a threshold size are retained.

In still another aspect, the automated driving controller executes instructions to filter the filtered aggregated data scan based on a second outlier-robust model estimation algorithm to determine an aggregated filtered data point cloud.

In yet another aspect, the first outlier-robust model estimation algorithm is a random sample consensus (RANSAC) algorithm or a maximum likelihood estimation sample (MLESAC) algorithm.

In another aspect, the predefined number of individual scans depends upon a sampling rate of the radar sensor.

In still another aspect, the predefined number of individuals scans is equal to or greater than three.

In yet another aspect, the motion compensated scan aggregation technique is a motion-compensated RANSAC technique.

In another aspect, wherein the plurality of density-based clustering algorithms includes filtering the aggregated data scan based on radar cross sectional values.

In still another aspect, the plurality of density-based clustering algorithms include filtering the aggregated data scan based on a distance from respective neighboring detection points.

In yet another aspect, the plurality of density-based clustering algorithms are a density-based spatial clustering of applications with noise (DBSCAN).

In another aspect, the individual scans obtained by the plurality of radar sensors are expressed as spherical coordinates.

In still another aspect, the automated driving controller executes instructions to convert the spherical coordinates of the individual scans into cartesian coordinates, where the individual scans expressed in cartesian coordinate are then filtered to define the spatial region of interest.

In yet another aspect, the plurality of radar sensors include millimeter wave (mmWave) radar sensors.

In one aspect, a method of filtering and aggregating detection points of radar point clouds obtained by a radar sensor mounted to an autonomous vehicle is disclosed. The method includes filtering a plurality of individual scans of a surrounding environment obtained by the radar sensor to define a spatial region of interest, where the individual scans include data in the form of a radar point cloud including a plurality of detection points. The method includes filtering each of the individual scans to remove the detection points of the radar point cloud that represent moving objects based on a first outlier-robust model estimation algorithm. The method also includes aggregating a predefined number of the individual scans together based on a motion compensated aggregation technique to create an aggregated data scan. Finally, the method includes applying a plurality of density-based clustering algorithms to filter the aggregated data scan to determine a filtered aggregated data scan.

In another aspect, the method includes filtering each of the individual scans based on a radar cross sectional value, where the plurality of detection points of the radar point cloud representing target objects of a threshold size are retained.

In still another aspect, the method includes filtering the filtered aggregated data scan based on a second outlier-robust model estimation algorithm to determine an aggregated filtered data point cloud.

In yet another aspect, the individual scans obtained by the radar sensor are expressed as spherical coordinates.

In another aspect, the method includes converting the spherical coordinates of the individual scans into cartesian coordinates, where the individual scans expressed in cartesian coordinate are then filtered to define the spatial region of interest.

In an aspect, a scan aggregator and filter for an autonomous vehicle is disclosed. The scan aggregator and filter includes a plurality of radar sensors mounted to the autonomous vehicle, where each radar sensor performs a plurality of individual scans of a surrounding environment to obtain data in the form of a radar point cloud including a plurality of detection points. The scan aggregator and filter includes an automated driving controller in electronic communication with the plurality of radar sensors. The automated driving controller is instructed to filter each of the individual scans to define a spatial region of interest. The automated driving controller is instructed to filter each of the individual scans based on a radar cross sectional value, where the plurality of detection points of the radar point clouds representing target objects of a threshold size are retained. The automated driving controller is instructed to filter each of the individual scans to remove the detection points of the radar point cloud that represent moving objects based on a first outlier-robust model estimation algorithm. The automated driving controller is instructed to aggregate a predefined number of the individual scans together based on a motion compensated aggregation technique to create an aggregated data scan. The automated driving controller is instructed to apply a plurality of density-based clustering algorithms to filter the aggregated data scan to determine a filtered aggregated data scan. Finally, the automated driving controller is instructed to filter the filtered aggregated data scan based on a second outlier-robust model estimation algorithm to determine an aggregated filtered data point cloud.

In one aspect, the individual scans obtained by the plurality of radar sensors are expressed as spherical coordinates, and the automated driving controller executes instructions to convert the spherical coordinates of the individual scans into cartesian coordinates. The individual scans expressed in cartesian coordinate are then filtered to define the spatial region of interest.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
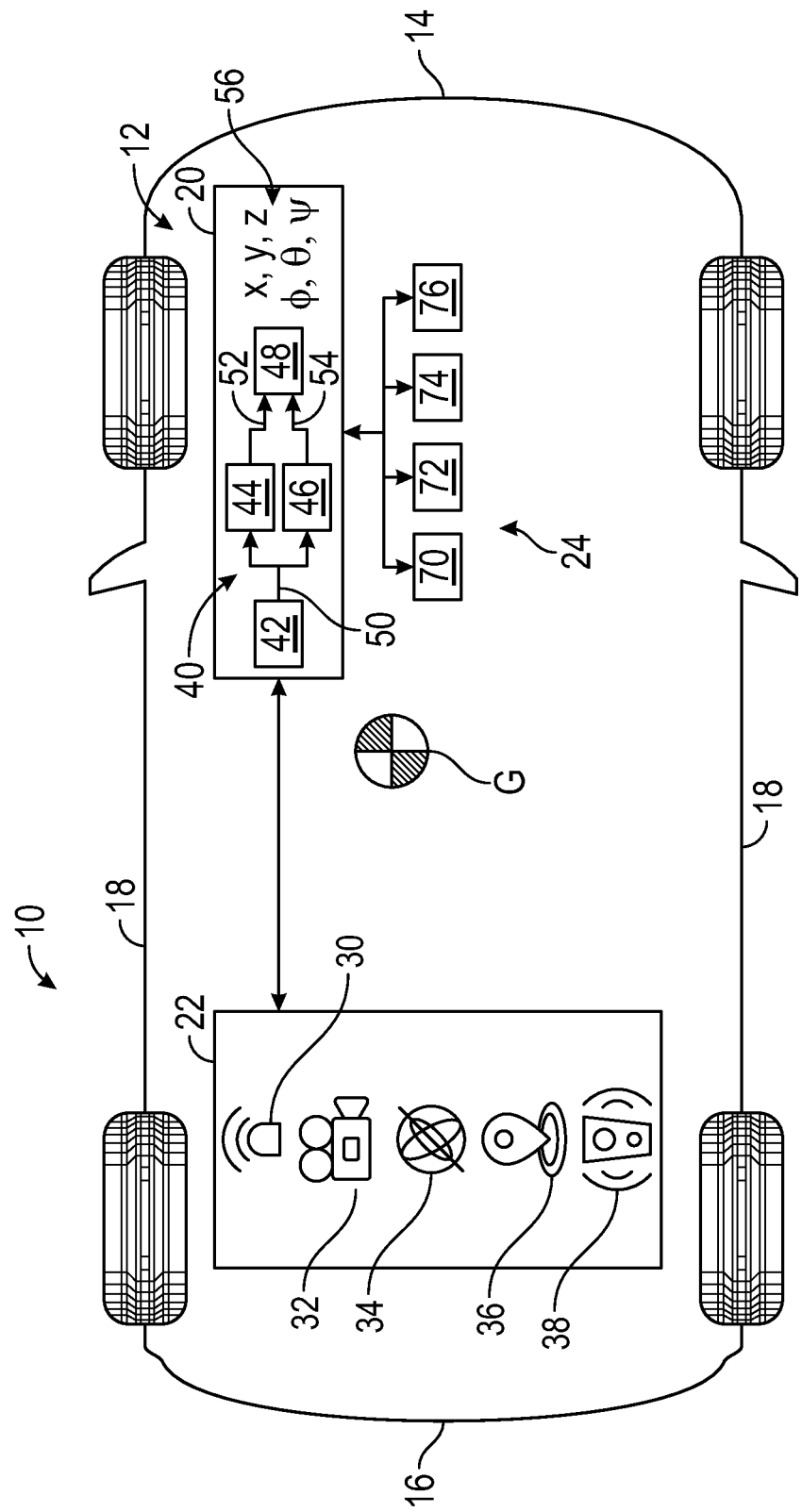
FIG. 1 is a schematic diagram of an autonomous vehicle including a plurality of radar sensors and an automated driving controller, where the automated driving controller includes a pose estimation pipeline for determining calibration coordinates, according to an exemplary embodiment.

Referring to FIG. 1, an exemplary autonomous vehicle 10 is illustrated. The autonomous vehicle 10 has an autonomous driving system 12 that includes an automated driving controller 20 in electronic communication with a plurality of on-board autonomous sensors 22 and a plurality of vehicle systems 24. In the example as shown in FIG. 1, the plurality of on-board autonomous sensors 22 include one or more radar sensors 30, one or more cameras 32, an inertial measurement unit (IMU) 34, a global positioning system (GPS) 36, and LiDAR 38, however, it is to be appreciated that additional sensors may be used as well. The plurality of radar sensors 30 may be mounted to the front 14, the rear 16, and/or the sides 18 of the autonomous vehicle 10 to detect objects in an environment surrounding the autonomous vehicle 10. Each radar sensor 30 performs a plurality of individual scans of the environment surrounding the autonomous vehicle 10 to obtain data in the form of a radar point cloud including a plurality of detection points.

The automated driving controller 20 includes a pose estimation pipeline 40 including a scan aggregator and filter 42, an inertial navigation system (INS) module 44, a scan matching and radar pose estimation module 46, and a calibration module 48. As explained below, the scan aggregator and filter 42 determines an aggregated filtered data point cloud 50 that is sent the scan matching and radar pose estimation module 46. A timestamp of the scan associated with the aggregated filtered data point cloud 50 is sent to the INS module 44. The INS module 44 determines time-matched IMU poses 52 with corresponding radar poses that are sent to the calibration module 48, and the scan matching and radar pose estimation module 46 determines final radar poses 54 that are sent to the calibration module 48. The calibration module 48 determines six degrees of freedom (6DoF) variables 56 that include x, y, and z coordinates as well as a roll $\varphi$, pitch $\theta$, and yaw $\Psi$ of the autonomous vehicle 10. In an embodiment, the six degrees of freedom (6DoF) 56 are radar to vehicle calibration parameters that are employed to automatically align the radar sensors 30 with a center of gravity G of the autonomous vehicle 10. However, it is to be appreciated that the disclosed scan aggregator and filter 42 is not limited to 6DoF radar to vehicle calibration parameters and may be used for other applications as well. For example, in another embodiment, the scan aggregator and filter 42 may be used for three-dimensional radar based simultaneous localization and mapping (SLAM) applications.

It is to be appreciated that the radar point clouds obtained by the radar sensors 30 may be sparse, and in some instances include noisy and jittery data, ghost detections, reflections, and clutter. As explained below, the scan aggregator and filter 42 filters and aggregates the radar point clouds obtained by the radar sensors 30 to reduce the impact of various noise sources, as well as to also increase the density of the point cloud scans. The scan aggregator and filter 42 may reduce but does not completely eliminate the noise in the radar point clouds. Similarly, the scan aggregator and filter 42 may reduce but does not completely solve the issue of sparsity in the radar point clouds. However, the impact of noise is reduced to enhance the functionality of other algorithms executed by the modules downstream of the scan aggregator and filter 42 in the pose estimation pipeline 40 (i.e., the INS module 44, the scan matching and radar pose estimation module 46, and the calibration module 48). Similarly, the density of the radar scans is increased to enhance the robustness and stability of other algorithms executed by the modules downstream of the scan aggregator and filter 42 in the pose estimation pipeline 40.

The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) for performing all driving tasks. Alternatively, in another embodiment, the autonomous vehicle 10 is a semi-autonomous vehicle including an advanced driver assistance system (ADAS) for assisting a driver with steering, braking, and/or accelerating. The automated driving controller 20 determines autonomous driving features such as perception, planning, localization, mapping, and control of the autonomous vehicle 10. Although FIG. 1 illustrates the automated driving controller 20 as a single controller, it is to be appreciated that multiple controllers may be included as well. The plurality of vehicle systems 24 include, but are not limited to, a brake system 70, a steering system 72, a powertrain system 74, and a suspension system 76. The automated driving controller 20 sends vehicle control commands to the plurality of vehicle systems 24 to guide the autonomous vehicle 10.

The radar sensors 30 may be a short range radar for detecting objects from about 1 to about 20 meters from the autonomous vehicle 10, a medium range radar for detecting objects from about 1 to about 60 meters from the autonomous vehicle 10, or a long range radar for detecting objects up to about 260 meters from the autonomous vehicle 10. In one embodiment, the one or more of the radar sensors 30 include millimeter wave (mmWave) radar sensors, and in particular low-cost signal system on chip (SoC) based millimeter wave radar sensors having a limited field-of-view. In another embodiment, the radar sensors 30 include one or more 360 degree rotating radar sensors.

Figure 2:
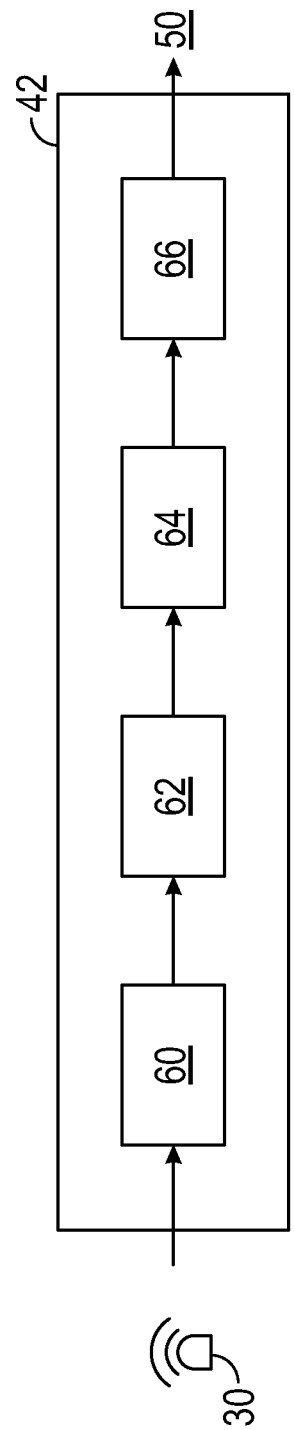
FIG. 2 is a block diagram illustrating a scan aggregator and filter that is part of the pose estimation pipeline, according to an exemplary embodiment.

Referring now to FIG. 2, a block diagram illustrating the scan aggregator and filter 42 is shown, where the scan aggregator and filter 42 includes a coordinate converter 60, an individual filter scanner 62, a motion compensated scan aggregator 64, and an aggregated scan filter 66 that outputs the aggregated filtered data point cloud 50. The coordinate converter 60 of the scan aggregator and filter 42 receives the plurality of individual scans from one of the radar sensors 30. In some embodiments, the individual scans obtained by the radar sensor 30 are expressed as spherical coordinates that indicate range, azimuth, and elevation. If applicable, the coordinate converter 60 converts the spherical coordinates of the individual scans into cartesian coordinates, and the plurality of individual scans are then sent to the individual filter scanner 62. However, if the individual scans are already expressed as cartesian coordinates, then the plurality of individual scans are received directly by the individual filter scanner 62.

The individual filter scanner 62 performs a first stage of filtering, where each of the individual scans are filtered to define a spatial region of interest. The spatial region of interest is a three-dimensional area representing a portion of the environment surrounding the autonomous vehicle 10 (FIG. 1). In an embodiment, the spatial area of interest may be defined based on minimum and maximum cartesian coordinate values of the three-dimensional area representing the portion of the environment surrounding the autonomous vehicle 10 (i.e., the minimum and maximum values for x, y, and z coordinates). The individual filter scanner 62 also filters the individual scans based on a radar cross sectional value, where detection points of the radar point cloud representing target objects of a threshold size are retained. The threshold size indicates an object of a predetermined size, as larger objects tend to result in more robust calibrations results while smaller objects result in less reliable results. For example, in one embodiment, the threshold size includes objects having radar cross sectional values of at least −10 decibels per square meter (dBsm).

The first stage of filtering performed by the individual filter scanner 62 also includes filtering each of the individual scans to remove detection points of the radar point cloud that represent moving objects, while retaining detection points that represent stationary targets based on a first outlier-robust model estimation algorithm. One example of an outlier-robust model estimation algorithm is a sample consensus algorithm such as, but not limited to, a random sample consensus (RANSAC) algorithm or a maximum likelihood estimation sample (MLESAC) algorithm. The first outlier-robust model estimation algorithm filters the plurality of detection points based on their respective velocities to determine which of the plurality of detection points of the radar point cloud represent stationary targets. It is to be appreciated that each detection point of the radar point cloud includes a direction of arrival azimuth and elevation angle relative to the respective radar sensor 30. Based on a relationship between vehicle speed, radial velocity (based on Doppler values), and angles of arrival, the detection points are filtered based on whether they represent stationary targets versus moving objects.

Continuing to refer to FIG. 2, the individual scans are then sent to the motion compensated scan aggregator 64 of the scan aggregator and filter 42. The motion compensated scan aggregator 64 aggregates a predefined number of individual scans N together based on a motion compensated scan aggregation technique to create an aggregated data scan. The predefined number individual scans N depends upon a sampling rate of the radar sensor 30, however, it is to be appreciated that the predefined number of individuals scans N is equal to or greater than three. The motion compensated scan aggregation technique determines the relative positions from which each of the predefined number of individual scans N were obtained.

One example of a motion compensated scan aggregation technique is a motion-compensated RANSAC technique. The motion-compensated RANSAC technique considers an angular velocity of the autonomous vehicle 10 (FIG. 1), a linear velocity of the autonomous vehicle 10, and a time difference between the predefined number of individual scans to reject outlier detection points and estimate relative transformations based on inlier points that match a specific velocity profile. It is to be appreciated that the detection point density of the individual scans is generally not high enough to achieve robust tracking results based on conventional iterative closest point (ICP) methods that do not account for motion of the autonomous vehicle 10.

The aggregated data scan from the motion compensated scan aggregator 64 is sent to the aggregated scan filter 66 of the scan aggregator and filter 42. The aggregated scan filter 66 applies a plurality of density-based clustering algorithms to filter the aggregated data scan received from the motion compensated scan aggregator 64 to determine a filtered aggregated data scan. Specifically, the plurality of density-based clustering algorithms include filtering the aggregated data scan based on radar cross sectional values as well as a distance from a specific detection point and respective neighboring detection points. In one specific, embodiment, only the density-based clustering algorithm based on the distance from a specific detection point and respective neighboring detection points may be used to determine the filtered aggregated data scan, however, it is to be appreciated that effectiveness may be reduced. It is to be appreciated that detection points coming from a specific area, such as a specific portion of a building or an area with trees, have similar radar cross sectional values. Moreover, when the density-based clustering algorithm filters the detection points based on distance, this reveals key areas or hotspots with a relatively high concentration of points. In an embodiment, the plurality density-based clustering algorithms are a density-based spatial clustering of applications with noise (DBSCAN), however, it is to be appreciated that other algorithms may be used as well such as, for example, k-means clustering, hierarchal clustering, or Gaussian mixture model clustering. It is also to be appreciated that density-based clustering algorithms for the radar cross sectional values as well as the distance from a specific detection point and respective neighboring detection points are usually only used with aggregated scans, and not individual scans (the density-based clustering algorithms may be used for individual scans, but are usually only effective if the scans are relatively dense).

Once the density-based clustering algorithm filters the aggregated data scan for the radar cross sectional values and the distance from a specific detection point and respective neighboring detection points, the aggregated scan filter 66 filters the filtered aggregated data scan to remove detection points of the radar point clouds that represent moving objects, while retaining detection points that represent stationary targets based on a second outlier-robust model estimation algorithm to determine the aggregated filtered data point cloud 50. As mentioned above, in an example the second outlier-robust model estimation algorithm is a sample consensus algorithms such as a RANSAC algorithm or a MLESAC algorithm. The second outlier-robust model estimation algorithm filters the plurality of detection points based on their respective velocities to determine which of the plurality of detection points of the radar point cloud represent stationary targets.

Figure 3:
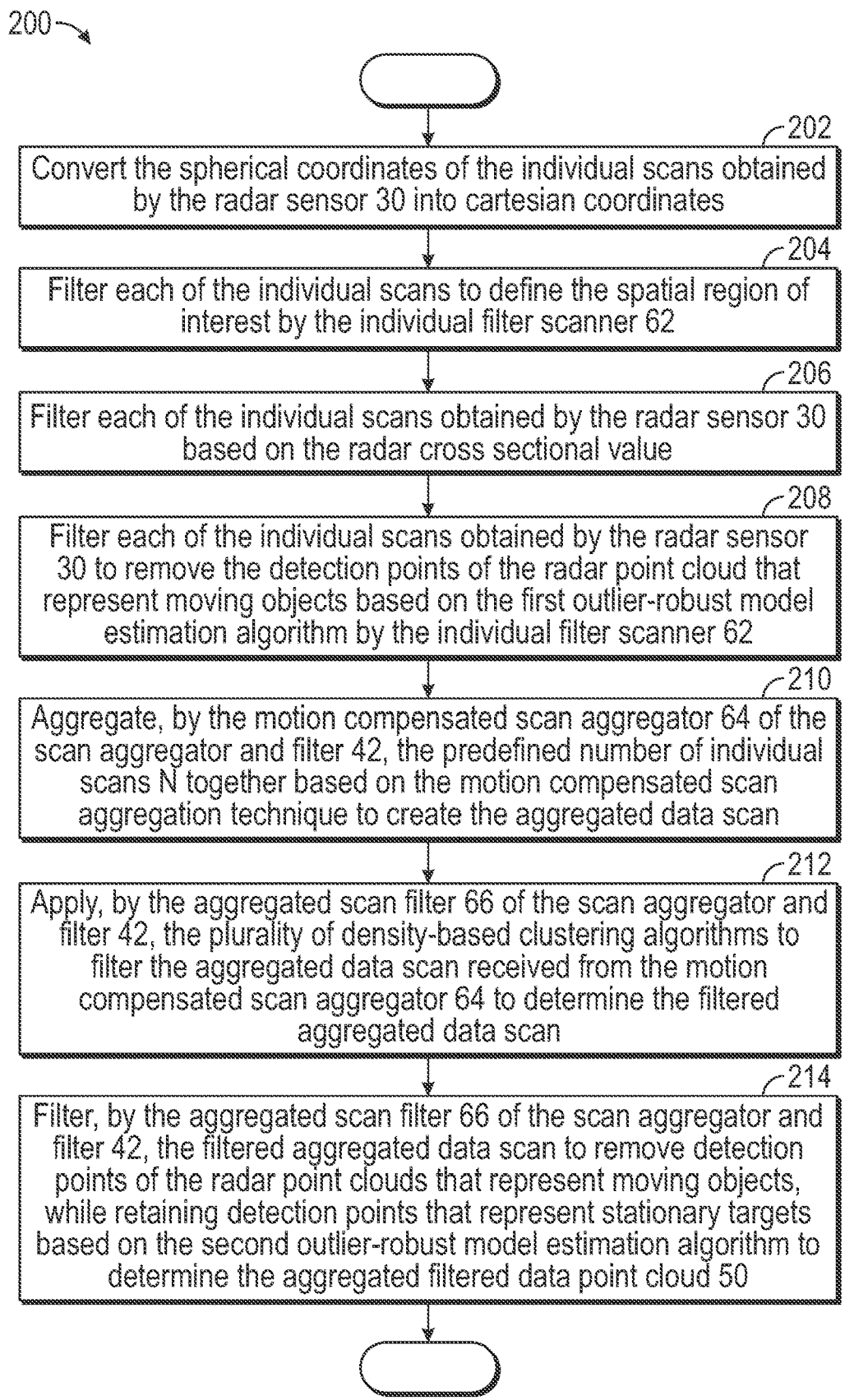
FIG. 3 is a process flow diagram illustrating a method for filtering and aggregating detection points of radar point clouds obtained by the radar sensors shown in FIG. 1, according to an exemplary embodiment.

FIG. 3 is a process flow diagram illustrating a method 200 for filtering and aggregating the detection points of the radar point clouds obtained by the radar sensors 30 (seen in FIG. 1) to reduce the impact of various noise sources as well as to also increase the density of the point cloud scans. Referring generally to FIGS. 1-3, the method 200 begins at block 202. In block 202, the coordinate converter 60 of the scan aggregator and filter 42 converts the spherical coordinates of the individual scans obtained by the radar sensor 30 into cartesian coordinates. It is to be appreciated that block 202 is optional, and if the individual scans are already expressed as cartesian coordinates, then block 202 may be omitted. The method 200 may then proceed to block 204.

In block 204, each of the individual scans are filtered to define the spatial region of interest by the individual filter scanner 62. The method 200 may then proceed to block 206.

In block 206, each of the individual scans obtained by the radar sensor 30 are filtered based on the radar cross sectional value, where detection points of the radar point cloud representing target objects of a threshold size are retained by the individual filter scanner by the individual filter scanner 62. The method 200 may then proceed to block 208.

In block 208, each of the individual scans obtained by the radar sensor 30 are filtered to remove the detection points of the radar point cloud that represent moving objects based on the first outlier-robust model estimation algorithm by the individual filter scanner 62. As mentioned above, in an embodiment the first outlier-robust model estimation algorithm is a sample consensus algorithm such as, for example, a RANSAC algorithm or a MLESAC algorithm. The method 200 may then proceed to block 210.

In block 210, the motion compensated scan aggregator 64 of the scan aggregator and filter 42 aggregates the predefined number of individual scans N together based on the motion compensated scan aggregation technique to create the aggregated data scan. As mentioned above, the predefined number individual scans N depends upon a sampling rate of the radar sensor 30. The method 200 may then proceed to block 212.

In block 212, the aggregated scan filter 66 of the scan aggregator and filter 42 applies the plurality of density-based clustering algorithms to filter the aggregated data scan received from the motion compensated scan aggregator 64 to determine the filtered aggregated data scan. As mentioned above, the plurality of density-based clustering algorithms include filtering the aggregated data scan based on the radar cross sectional values as well as the distance from a specific detection point and respective neighboring detection points. The method 200 may then proceed to block 214.

In block 214, the aggregated scan filter 66 of the scan aggregator and filter 42 filters the filtered aggregated data scan to remove detection points of the radar point clouds that represent moving objects, while retaining detection points that represent stationary targets based on the second outlier-robust model estimation algorithm to determine the aggregated filtered data point cloud 50. The method 200 may then terminate.

Referring generally to the figures, the scan aggregator and filter for the autonomous vehicle provides various technical effects and benefits. Specifically, the disclosure provides an approach to filter and aggregate the radar point clouds obtained by the radar sensors to reduce the impact of various noise sources, as well as to also increase the density of the point cloud scans. In embodiments, the filtered and aggregated radar point clouds are employed as part of a pose estimation that is used for alignment purposes in a vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An autonomous driving system for an autonomous vehicle, the autonomous driving system comprising:
    a plurality of radar sensors mounted to the autonomous vehicle, wherein each individual radar sensor performs a plurality of individual scans of a surrounding environment to obtain data in the form of a radar point cloud including a plurality of detection points;
    an inertial measurement unit (IMU); and
    an automated driving controller in electronic communication with the plurality of radar sensors, wherein the automated driving controller is instructed to:
        filter each of the individual scans to define a spatial region of interest;
        filter each of the individual scans to remove the detection points of the radar point cloud that represent moving objects based on a either a random sample consensus algorithm or a maximum likelihood estimation sample algorithm;
        aggregate a predefined number of individual scans together based on a motion compensated aggregation technique to create an aggregated data scan;
        apply a plurality of density-based clustering algorithms to filter the aggregated data scan to determine a filtered aggregated data scan;
        filter the filtered aggregated data scan based on either a random sample consensus algorithm or a maximum likelihood estimation sample algorithm to determine an aggregated filtered data point cloud;
        determine time-matched IMU poses and corresponding radar poses based on the aggregated filtered data point cloud;
        determine a plurality of radar to vehicle calibration parameters based on the IMU poses and radar poses; and
        automatically align the radar sensors with a center of gravity of the autonomous vehicle based on the calibration parameters.

2. The autonomous driving system of claim 1, wherein the automated driving controller executes instructions to:
    filter each of the individual scans based on a radar cross sectional value, wherein the plurality of detection points of the radar point cloud representing target objects of a threshold size are retained.

3. The autonomous driving system of claim 1, wherein the predefined number of individual scans depends upon a sampling rate of the radar sensor.

4. The autonomous driving system of claim 1, wherein the predefined number of individuals scans is equal to or greater than three.

5. The autonomous driving system of claim 1, wherein the motion compensated scan aggregation technique is a motion-compensated RANSAC technique.

6. The autonomous driving system of claim 1, wherein the plurality of density-based clustering algorithms includes filtering the aggregated data scan based on radar cross sectional values.

7. The autonomous driving system of claim 1, wherein the plurality of density-based clustering algorithms include filtering the aggregated data scan based on a distance from respective neighboring detection points.

8. The autonomous driving system of claim 1, wherein the plurality of density-based clustering algorithms are a density-based spatial clustering of applications with noise (DBSCAN).

9. The autonomous driving system of claim 1, wherein the individual scans obtained by the plurality of radar sensors are expressed as spherical coordinates.

10. The autonomous driving system of claim 9, wherein the automated driving controller executes instructions to:
    convert the spherical coordinates of the individual scans into cartesian coordinates, wherein the individual scans expressed in cartesian coordinate are then filtered to define the spatial region of interest.

11. The autonomous driving system of claim 1, wherein the plurality of radar sensors include millimeter wave (mmWave) radar sensors.

12. A method of filtering and aggregating detection points of radar point clouds obtained by a radar sensor mounted to an autonomous vehicle having an inertial measurement unit (IMU) and an automated driving controller, the method comprising:
    performing a plurality of individual scans of a surrounding environment of the autonomous vehicle by the radar sensor; and
    by the automated driving controller:
        filtering the individual scans to define a spatial region of interest, wherein the individual scans include data in the form of a radar point cloud including a plurality of detection points;
        filtering each of the individual scans to remove the detection points of the radar point cloud that represent moving objects based on either a random sample consensus algorithm or a maximum likelihood estimation sample algorithm;
        aggregating a predefined number of the individual scans together based on a motion compensated aggregation technique to create an aggregated data scan;
    applying a plurality of density-based clustering algorithms to filter the aggregated data scan to determine a filtered aggregated data scan;
        filtering the filtered aggregated data scan based on either a random sample consensus algorithm or a maximum likelihood estimation sample algorithm to determine an aggregated filtered data point cloud;
        determining time-matched IMU poses and corresponding radar poses based on the aggregated filtered data point cloud;
        determining a plurality of radar to vehicle calibration parameters based on the IMU poses and radar poses; and
        automatically aligning the radar sensor with a center of gravity of the autonomous vehicle based on the calibration parameters.

13. The method of claim 12, further comprising:
    filtering each of the individual scans based on a radar cross sectional value, wherein the plurality of detection points of the radar point cloud representing target objects of a threshold size are retained.

14. The method of claim 12, wherein the individual scans obtained by the radar sensor are expressed as spherical coordinates.

15. The method of claim 14, further comprising:
    converting the spherical coordinates of the individual scans into cartesian coordinates, wherein the individual scans expressed in cartesian coordinate are then filtered to define the spatial region of interest.

16. An autonomous driving system for an autonomous vehicle, the autonomous driving system comprising:
a plurality of radar sensors mounted to the autonomous vehicle, wherein each radar sensor performs a plurality of individual scans of a surrounding environment to obtain data in the form of a radar point cloud including a plurality of detection points;
an inertial measurement unit (IMU); and
an automated driving controller in electronic communication with the plurality of radar sensors, wherein the automated driving controller is instructed to:
filter each of the individual scans to define a spatial region of interest;
filter each of the individual scans based on a radar cross sectional value, wherein the plurality of detection points of the radar point cloud representing target objects of a threshold size are retained;
filter each of the individual scans to remove the detection points of the radar point cloud that represent moving objects based on either a random sample consensus algorithm or a maximum likelihood estimation sample algorithm;
aggregate a predefined number of the individual scans together based on a motion compensated aggregation technique to create an aggregated data scan;
apply a plurality of density-based clustering algorithms to filter the aggregated data scan to determine a filtered aggregated data scan;
filter the filtered aggregated data scan based on either a random sample consensus algorithm or a maximum likelihood estimation sample algorithm to determine an aggregated filtered data point cloud;
determine time-matched IMU poses and corresponding radar poses based on the aggregated filtered data point cloud;
determine a plurality of radar to vehicle calibration parameters based on the IMU poses and radar poses; and
automatically align the radar sensors with a center of gravity of the autonomous vehicle based on the calibration parameters.

17. The autonomous driving system of claim 16, wherein the individual scans obtained by the plurality of radar sensors are expressed as spherical coordinates, and wherein the automated driving controller executes instructions to:
convert the spherical coordinates of the individual scans into cartesian coordinates, wherein the individual scans expressed in cartesian coordinate are then filtered to define the spatial region of interest.

18. The autonomous driving system of claim 16, wherein the predefined number of individual scans depends upon a sampling rate of the radar sensor.

19. The autonomous driving system of claim 16, wherein the predefined number of individuals scans is equal to or greater than three.

20. The autonomous driving system of claim 16, wherein the motion compensated scan aggregation technique is a motion-compensated RANSAC technique.

* * * * *